United States Patent [19]

Champlin

[11] 4,400,883
[45] Aug. 30, 1983

[54] SURFACE LAYOUT GAUGE

[76] Inventor: Walter B. Champlin, P.O. Box 94, Wickenburg, Ariz. 85358

[21] Appl. No.: 283,893

[22] Filed: Jul. 16, 1981

[51] Int. Cl.³ .............................................. G01B 3/20
[52] U.S. Cl. ............................... 33/169 R; 33/143 J; 33/143 K
[58] Field of Search ............... 33/169 R, 170, 172 R, 33/169 B, 143 K, 143 J

[56] References Cited

U.S. PATENT DOCUMENTS

| | | | |
|---|---|---|---|
| 1,795,973 | 3/1931 | Sobel | 33/169 R X |
| 2,346,063 | 4/1944 | Bardega | 33/170 |
| 2,412,870 | 12/1946 | Champlin | 33/169 R |
| 3,220,114 | 11/1965 | Mecone et al. | 33/170 |
| 3,701,199 | 10/1972 | Lewis | 33/169 R X |

FOREIGN PATENT DOCUMENTS

| | | | |
|---|---|---|---|
| 621302 | 7/1961 | Italy | 33/143 K |
| 50850 | 3/1910 | Switzerland | 33/158 |
| 1135553 | 12/1968 | United Kingdom | 33/143 K |

*Primary Examiner*—William D. Martin, Jr.
*Attorney, Agent, or Firm*—Warren F. B. Lindsley

[57] ABSTRACT

An improved surface layout gauge for use in making successive point-to-point measurements with a high degree of accuracy and employing improved means for making vernier adjustments and mounting of the sliding scriber to improve the accuracy of the gauge.

3 Claims, 12 Drawing Figures

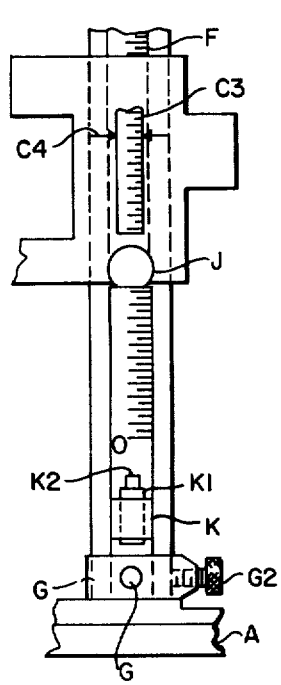
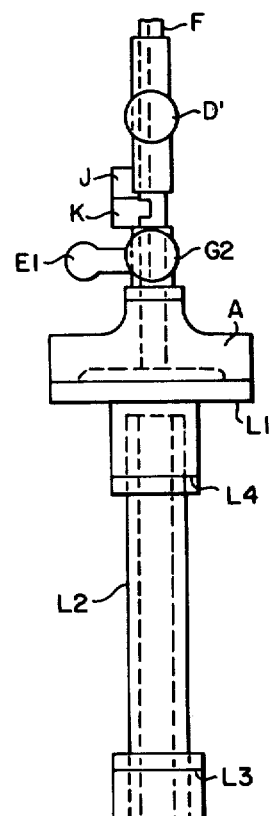
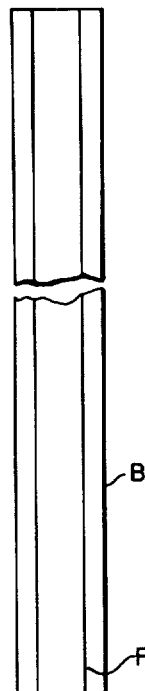
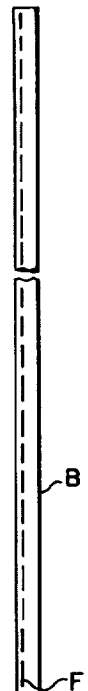
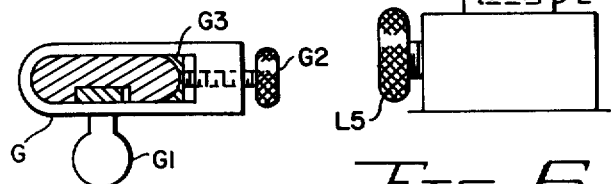
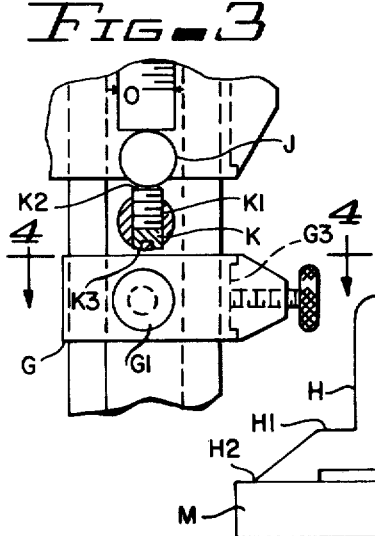
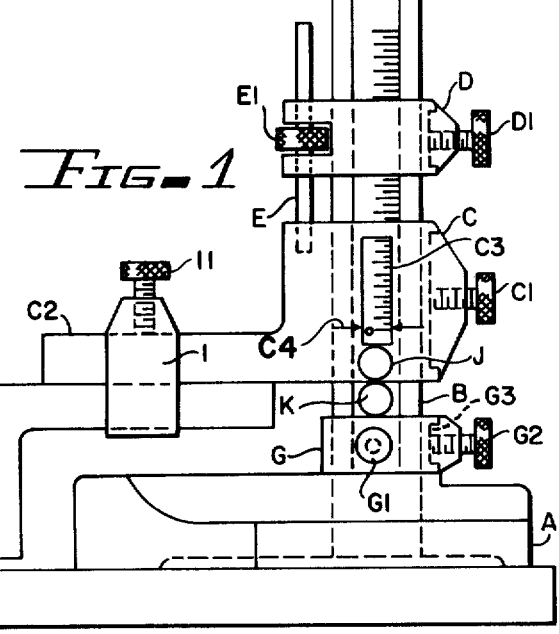
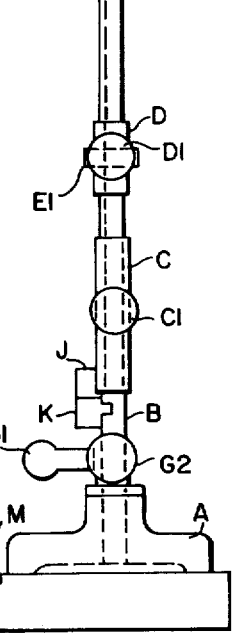

SURFACE LAYOUT GAUGE

BACKGROUND OF THE DISCLOSURE

In laying out dimensions on metals or other materials in preparation for drilling, machining or other fabrication operations, the initial sheet or block of the material is typically set on edge on a plane surface or base plate. Dimensions related to the edge resting on the base plate are then measured as elevations above the surface using a form of gauge that is designed for use in this manner.

In the performance of work with instruments of this character the dimensions given on the drawing are not always taken from a single point, but are frequently marked between successive points in the structure. Consequently, if the operator is working with his gauge from a single plane it is necessary to make a mental calculation in the laying out of a dimension which is not taken from this plane. Gauges have been provided with sliding scales so that after laying out one dimension the scale may be shifted with its zero marking at a different point to lay out another dimension. However, in successively shifting the scale slight errors in adjustment occur so that some of the markings may be inaccurate.

U.S. Pat. No. 2,412,870 discloses a gauge construction employing a movable scale resulting in improved accuracy in terms of scale adjustment. This instrument incorporates a means for extending its use beyond the adjustment limitations of the gauge per se. While this instrument meets the intended objects of this invention, it leaves room for improvements in the making of fine vernier adjustments of the scale portion. The present invention also discloses a means for making such fine, accurate vernier adjustments without difficulty.

SUMMARY OF THE INVENTION

In accordance with the invention claimed an improved surface layout gauge is provided with means for accomplishing accurate vernier adjustments.

It is, therefore, one object of the present invention to provide an improved surface layout gauge.

Another object of this invention is to provide an improved surface layout gauge that permits greater accuracy in the making of successive point-to-point measurements which are not referenced directly from the base plate surface on which the object is edge mounted.

A further object of this invention is to provide a layout gauge employing an improved means for effecting very fine and extremely accurate vernier adjustments of the position of a moving scale.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a side elevation of a prior art surface layout gauge over which the present invention offers improvements in accuracy and ease of operation;

FIG. 2 is an end elevation of the gauge shown in FIG. 1;

FIG. 3 is an enlarged view similar to a portion of FIG. 1 illustrating a means for effecting accurate adjustment of its scale;

FIG. 4 is a cross-sectional view of FIG. 3 taken along the line 4—4;

FIG. 5 is a view similar to FIG. 3 showing the parts in a different position of adjustment;

FIG. 6 is a sectional elevation of the extension standard for the gauge shown in FIGS. 1 and 2;

DESCRIPTION OF THE PREFERRED EMBODIMENT

Figure 7:
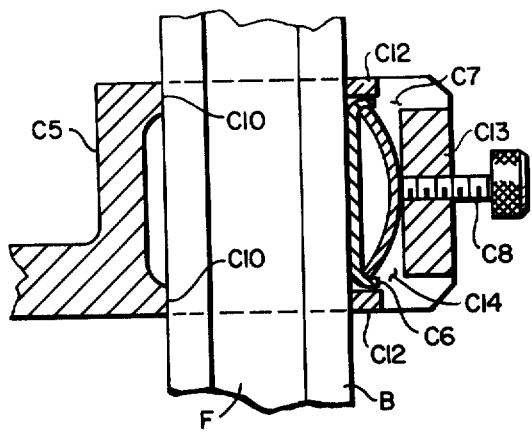
FIG. 7 is a cross-sectional view showing details of an improved frictional mounting and clamping means for the moving slide that carries the pointer or scribe associated with the gauge shown in FIGS. 1 and 2.

Referring more particularly to the drawings by characters of reference, FIGS. 1-6 disclose a surface layout gauge comprising a supporting base A having a column B rising therefrom. A slide C is adjustably mounted on column B and clamped thereto in different positions of adjustment by a set screw C1. An auxiliary slide D is slidably mounted on column B and selectively secured thereto by a set screw D1. An adjustable link E is positioned between slides C and D. This link comprises a threaded rod attached to slide C and passes through an aperture in slide D with an adjusting nut E1 being mounted on the rod and in a slot formed in slide D. This is the usual means employed in gauge constructions for facilitating accuracy in adjustment of the main slide.

Mounted on column B and preferably engaging a groove therein is a scale member F. Scale member F is provided with means for clamping the scale in different positions of adjustment on column B which, as shown, comprises a strap G surrounding column B and secured to the lower end of the scale. A handle G1 projecting from strap G is used for adjusting the same. A set screw G2 engaging a clamping block G3 serves to hold this strap in any adjusted position. Slide C has a projecting arm C2 to which is attachably secured the indicating arm or scriber H which is attached to arm C by a strap I and set screw I1. Member H has a downwardly offset portion H1 terminating in a scriber point H2. This structure permits the lowering of slide C until point H2 is in the supporting plane of base A.

As stated, it is one of the objects of this invention to obtain extreme accuracy in adjustment of scale member F so that its position is always a predetermined distance above the supporting base A. To obtain this result, a pair of cooperating lugs or contact members J and K have been provided with one secured to slide C and the other secured to scale member F. These contact members are so positioned relative to the markings on the scale member that when point H2 is in the supporting plane of the base and members J and K are in contact with each other the zero marking on the scale will register with an index line on the slide. Preferably, slide C is provided with a window opening C3 through which the markings on the scale may be read and an index line C4 extending on opposite sides of this opening registers with the zero marking under the conditions just described. To provide for extreme accuracy in the setting of members J and K in relation to each other, the latter may be, as shown in FIG. 3, provided with a screw K1 engaging a threaded aperture therein and provided with a projecting contact portion K2. The screw has a wrench socket K3 in its outer end portion so that it may be adjusted in its threaded bearing and the friction will be sufficient to hold it in any position of adjustment. Thus, the original setting of contacts K2 in relation to member J may be made with extreme accuracy and at any subsequent time readjustment may be made to compensate for wear.

Operation

In laying out work with the gauge shown in FIGS. 1-6, the object to be marked is placed on a suitable supporting surface, such as surface plate or support M. Base A of the gauge is also placed on this surface. Assuming that certain dimensions on a drawing are taken from a plane of the object which rests on support M then these may be readily laid out by adjusting slide C to the corresponding dimensions on scale F. Point H2 on arm H may be used as a scriber for marking lines on the object. Where a dimension on the drawing is taken from a point above the supporting base plane, the operator after first adjusting slide C to mark this point then unclamps strap G and raises the scale member F until contact K2 bears against lug J. This will restore the zero marking on the scale into registration with line C4 and after again clamping strap G, slide C may be adjusted to a marking on the scale corresponding to the dimension.

The height of the gauge cannot be unduly extended without either rendering the gauge unstable or objectionably increasing its weight. To overcome these limitations, an auxiliary standard is provided which may be used in conjunction with the gauge for marking dimensions that are beyond the range of the gauge height. This auxiliary standard is illustrated in FIG. 6 and comprises a base L, surface plate L1 and an intermediate member L2. The latter is preferably a hollow rod engaging sockets in members L and L1 and provided with shoulders L3 and L4 for respectively bearing on said members. The dimension between these shoulders is of an exactly predetermined length so that the upper face of surface plate L1 is an exact height above the lower face of base L. Preferably this base L is provided with a permanent magnet controlled by a knob L5 so that after being positioned on the base plate it is held thereon by magnetic attraction. The surface plate L1 is of sufficient area to furnish adequate support for base A of the gauge. Consequently, the gauge may be placed on this surface plate and dimensions laid out on the work which are known to be a predetermined height above the supporting base for the standard. To increase the range of this standard, the intermediate member L2 may be exchangeable with other corresponding members of different lengths to change the dimensions between the surface plate and the base. By the use of the instrument above described, work may be laid out much more expeditiously and with greater accuracy than possible with gauges heretofore used.

As shown in FIG. 1, the indicator is resting upon the supporting surface plate M and strap G is resting upon base A. This will hold the zero marking on the scale in registration with index line C4. Consequently, when slide C is at any position of adjustment on column B the total height of the indicator above the supporting plane for the base will be indicated by lowering the scale until strap G rests on base A. This is an important feature for it permits the user at any time to summarize a series of successive markings giving the sum of the separate measurements in one total on the scale.

It is important that the various movable members such as slide C which is adjustable on column B are mounted in a manner which permits them to be moved smoothly and easily. At the same time, they should not be so loosely mounted that their positions cannot be maintained until they are locked or secured by the associated set screws. If these mounting conditions are not met it will be very difficult if not impossible to achieve the necessary adjustment accuracy.

Figure 8:
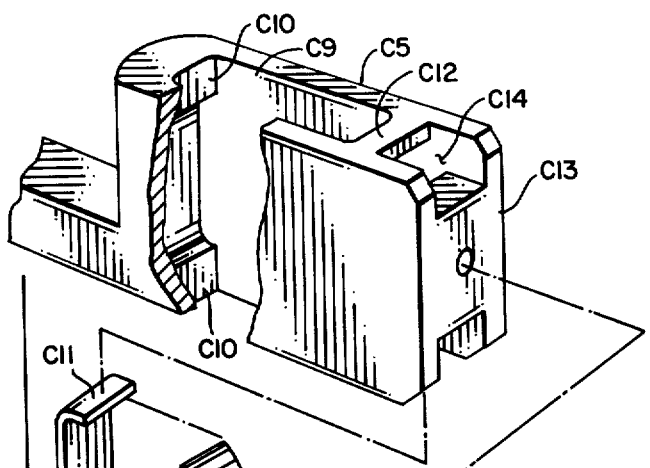
FIG. 8 is an exploded perspective view of the mounting and clamping means of FIG. 7 with one side partially broken away to show details of its interior.

FIGS. 7 and 8 illustrate a means for achieving the foregoing mounting conditions and disclose an improved mounting means for slide C the features of which are also applicable for mounting other members of the gauge such as the auxiliary slide D and strap G.

As shown in FIGS. 7 and 8, the improved slide C comprises a collar C5 that surrounds column B and scale F, a pressure plate or gib C6, a tempered curved spring C7, and a set screw C8.

Collar C5 is provided with a vertically arranged passageway C9 extending therethrough for receiving therein column B and scale F. This passageway comprises a generally rectangular cross-sectional configuration which accommodates column B in such a manner that the edges of column B face the narrow ends of the passageway. At one end of passageway C9, two shoulders C10 are provided, one above the other, which bear against the edge of column B in sliding contact therewith. A gib C6 bears against the opposite edge of column B under the pressure of spring C7.

As shown more clearly in FIG. 8, gib C6 is in the form of a flat elongated rectangular strip of metal that has a short tab C11 turned up at each end. Spring C7 is made from an elongated rectangular strip of tempered spring stock formed into an arc. The ends of spring C7 bear against tabs C11 of the gib and are retained against vertical displacement. The concave surface of spring C7 faces gib C6.

Gib C6 and spring C7 are retained within collar C5 in position against column B by means of two ribs C12 and an end plate C13 incorporated in the geometry of collar C5. Ribs C12 define the upper and lower edges of passageway C9 at the end opposite shoulders C10. The upper rib C12 is positioned directly opposite the upper shoulder C10 and the lower rib C12 is positioned opposite the lower shoulder C10. The vertical distance between the two ribs C12 accommodates the length dimension of gib C6 which is positioned therebetween in a manner such that the ribs secure the vertical position of the gib. The end plate C13 forms an outer vertical wall of collar C5. Plate C13 is parallel with the edge of column B and is spaced apart therefrom to form an appropriate cavity between its inner surface and the edge of column B to receive gib C6 and spring C7. The cavity dimension is such that the spring is retained therein at the desired pressure. Openings C14 between plate C13 and ribs C12 permit the installation of gib C6 and spring C7.

At the center of plate C13 a tapped horizontal hole C15 is provided which threadably receives set screw C8. As set screw C8 is installed, its leading end bears against the convex surface of spring C7 causing spring C7 to be flattened against gib C6 and thereby increasing the pressure exerted against the edge of column B. Through the tightening of set screw C8 the pressure may be increased as desired for optimum sliding friction or until collar C5 and slide C are locked into a desired position under column B. The mounting means, as described, permits adjustment of sliding pressure as appropriate for a smooth sliding motion with an appropriate amount of drag as needed to achieve and hold an accurately controlled position as the slide is locked into place by means of the set screw.

Figure 9:
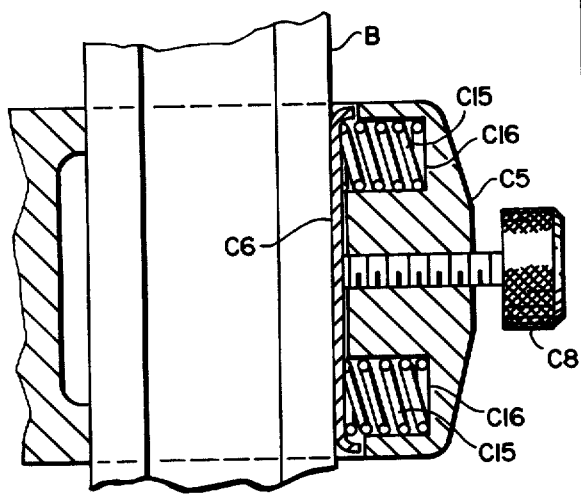
FIG. 9 is a cross-sectional view showing a variation of the mounting and clamping means of FIGS. 7 and 8.

A similar arrangement for achieving the desired amount of drag is illustrated in FIG. 9 where the curved spring C7 has been replaced by two coil springs C15. The coil springs are contained within cylindrical cavities C16 within collar C5. They bear horizontally against the upper and lower ends of gib C6 which bears against the edge of column B. Set screw C8 in this case bears directly against gib C6 when set for a locking operation.

Another difficulty associated with the surface layout gauge of the prior art is the making of very fine vernier adjustments of the position of scale F. The present invention provides a means for making such adjustments with a high degree of accuracy.

Figure 11:
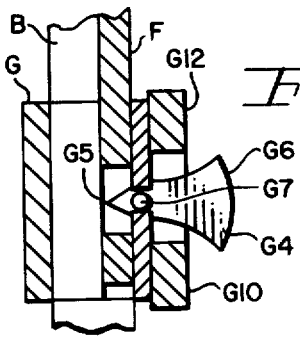
FIG. 11 is a cross-sectional end view showing details of the construction of the vernier adjustment means shown in FIG. 10.
Figure 10:
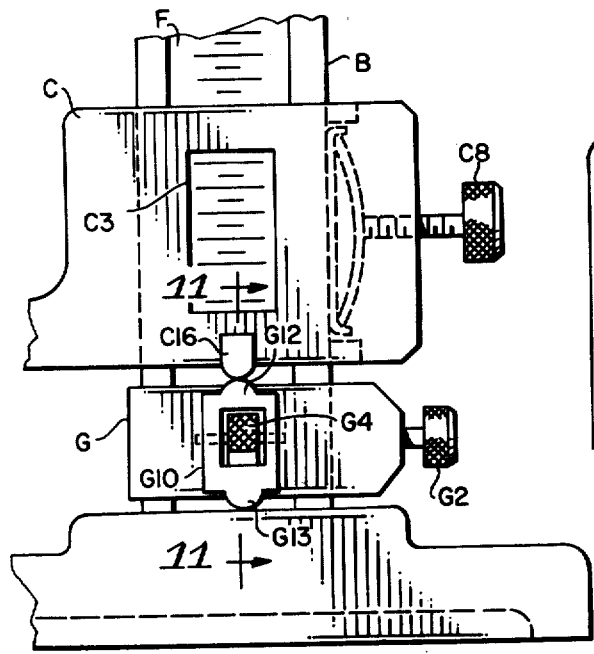
FIG. 10 is a partial side elevation of a surface layout gauge showing the frictional mounting means of FIGS. 7 and 8 and an improved means for effecting vernier adjustments of the position of the sliding scale.
Figure 12:
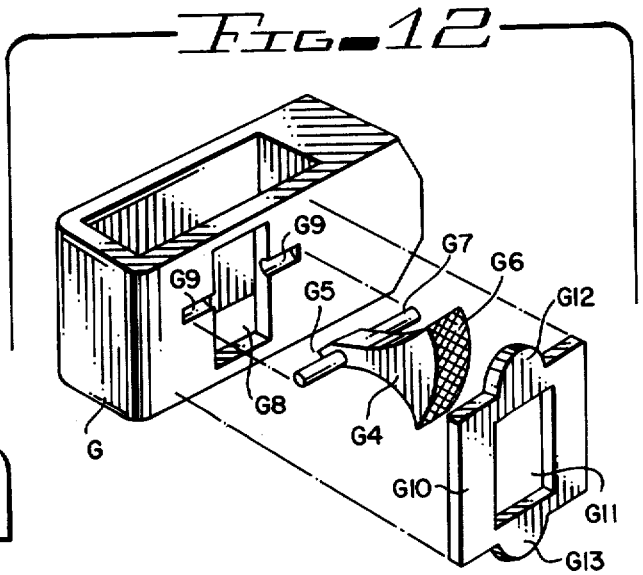
FIG. 12 is an exploded perspective view of the parts associated with the improved vernier adjustment means shown in FIGS. 1 and 11.

The means provided for making accurate vernier adjustments of the scale position, as shown in FIGS. 10-12, comprises a thumb-controlled lever G4 incorporated in the structure of strap G. This lever G4 has a point G5 on one end, a knurled thumb grip G6 at the opposite end and a pivot pin G7 positioned between point G5 and grip G6. Pin G7 extends perpendicularly from both sides of lever G4. A rectangular opening G8 in the face of collar G provides working clearance for point G5. Two shallow grooves G9 in the outer surface of strap G extending horizontally outward from the centers of the vertical sides of opening G8 serve as bearing cavities for the ends of pin G7. Lever G4 is installed in collar G by passing point G5 through opening G8, positioning the ends of pin G7 in grooves G9 and then positioning a rectangular frame G10 over the captured ends of pin G7.

The frame G10 has a center opening G11 of the same dimensions as opening G8 of strap G. Two spacing tabs G12 and G13 extend vertically upward and downward from the top and bottom edges, respectively, of the frame.

When frame G10 is cemented or otherwise secured in position on strap G with opening G11 aligned with opening G8, the sides of frame G10 cover grooves G9 and the contained ends of pin G7 so that pin G7 is trapped within grooves G9. Lever G4 may then be pivoted about pin G7 by means of thumb pressure applied to surface G6.

As in the case of the layout gauge of FIGS. 1-6, strap G is secured to the lower end of scale F. The lever G4 is thus also effectively attached to the lower end of scale F. As shown most clearly in FIG. 11, a hole or opening in scale F provides clearance for point G5 of lever G4.

When thumb pressure is applied to surface G6, the point G5 extending through the opening G14 impinges against the surface of column B. The surface of column B may be appropriately textured over the region contacted by point G5 so that with thumb pressure applied to surface G6 point G5 grips the textured surface. As lever G4 is then rocked or pivoted by thumb pressure about pin G7 the assembly comprising strap G, scale F and frame G10 are moved vertically upwardly or downwardly. The mechanical advantage provided by lever G4 permits such movement of the scale to be effected through the application of a relatively small amount of thumb pressure. Furthermore, because pin G7 is positioned much nearer to point G5 than to surface G6, the scale is moved only a small fraction of the distance surface G6 is moved. Finally, the contact maintained between point G5 and the textured surface of column B provides positive control over the scale position. These three conditions contribute to the achievement of the very fine and precise control of the scale position afforded through this feature of the present invention.

The spacing tabs G12 and G13 in cooperation with an additional spacing tab C16 which projects from the lower edge of slide C, as shown in FIG. 10, determine the lower or rest position of slide C. Thus, for example, when tab G13 rests on the surface of Base A and tab C16 is in contact with tab G12, the indicating arm or scriber H should rest on the surface of plate M and the index line C4 should be aligned with a zero reading on scale F. The position of tab C16 on slide C may be made adjustable to allow periodic calibration of this feature.

It will be recognized that both the frictional mounting means of FIGS. 7-9 and the lever control means of FIGS. 10-12 may be applied to either of the movable members including scale F with strap G and slide C carrying scriber H.

Although but a few embodiments of the invention have been illustrated and described, it will be apparent to those skilled in the art that various changes and modifications may be made therein without departing from the spirit of the invention or from the scope of the appended claims.

What is claimed is:

1. A layout gauge comprising:
   a base,
   a column rising therefrom,
   a slide on said column,
   a scale vertically slidable in a groove in said column,
   a strap to which the lower end of said scale is attached surrounding and slidable on said column,
   clamping means for holding said strap in different positions of adjustment, an indicator arm projecting laterally from said slide,
   cooperating members on said slide and scale adapted when in contact to register the zero marking on the scale with an index on the slide,
   said strap when lowered to rest on said base positioning said scale so as to give a direct reading of the total height of the indicator above the supporting plane for the base in each position of adjustment of said slide,
   lever means pivotally mounted on said strap for engaging the surface of said column for vertically moving said scale for fine adjustments,
   said lever means having one end thereof extending through an aperture in said scale to frictionally engage the surface of said column and with the other end of said lever being provided with a knurled surface for receiving thumb pressure of the user for making fine adjustments of said scale, and
   said slide further comprising spring means for applying frictional pressure to said column, said spring means comprising a gib in sliding engagement with said column, a spring mounted within said gib and an adjustment means for selectively increasing or decreasing the pressure on said spring to increase or decrease the friction between said slide and column.

2. The layout gauge set forth in claim 1 wherein: said spring means comprises a pair of coil springs.

3. The layout gauge set forth in claim 1 wherein: said spring means comprises a concave leaf spring.

* * * * *